United States Patent [19]

Cote et al.

[11] Patent Number: 5,152,481
[45] Date of Patent: Oct. 6, 1992

[54] KITE FRAME CONNECTOR

[76] Inventors: Andy Cote, 199 Wilton Rd., Peterborough, N.H. 03458; Jerry Greene, Candlewood Hill Rd., Francestown, N.H. 03043

[21] Appl. No.: 479,571

[22] Filed: Feb. 1, 1990

[51] Int. Cl.⁵ .......................................... B64C 31/06
[52] U.S. Cl. ........................ 244/153 R; 244/155 R; 403/268; 285/294; 285/297; 156/294
[58] Field of Search ............. 244/153 R, 153 A, 154, 244/155 R; 403/300, 305, 406.1, 234, 169-176, 265, 205, 268; 446/126, 124; 156/294; 285/294, 297

[56] References Cited

U.S. PATENT DOCUMENTS

| 1,394,137 | 10/1921 | Blair | 403/268 |
| 2,313,074 | 3/1943 | Jewell | 285/294 |
| 3,276,730 | 10/1966 | Cleveland | 244/153 R |
| 4,133,500 | 1/1979 | Chapman | 244/153 R |
| 4,159,087 | 6/1979 | Moomaw | 244/153 R |

FOREIGN PATENT DOCUMENTS

| 716468 | 8/1968 | Canada | 285/297 |
| 927363 | 5/1973 | Canada | 244/153 R |
| 2707492 | 8/1978 | Fed. Rep. of Germany | 285/294 |
| 661109 | 6/1987 | Switzerland | 285/294 |

Primary Examiner—Galen Barefoot
Attorney, Agent, or Firm—Wolf, Greenfield & Sacks

[57] ABSTRACT

A kite frame connector adapted to receive an elongated frame of a kite is provided. The connector has a main body with a surface defining a channel adapted to receive the kite frame member. A retention element extends from that surface into the channel for exerting a force on the frame member to retain the frame in the channel and for defining a chamber for receiving adhesive which acts to permanently secure the connector to the frame member. A passage through the side wall of the connector provides access to the chamber after the frame member is positioned in the connector.

26 Claims, 2 Drawing Sheets

KITE FRAME CONNECTOR

This invention relates generally to kites, and more particularly to frame connecting members for kites and kite frame assemblies.

BACKGROUND OF THE INVENTION

Various kite frame connectors and kite frame assemblies are known. Examples may be found in U.S. Pat. Nos. 3,276,730; 3,305,198; 3,570,792; 4,018,407; 4,286,762; 4,368,861; and 4,557,443.

A drawback of the known frame connector members is that they can be difficult to assemble. They also are not easily adapted to be glued securely in place, if desired.

SUMMARY OF THE INVENTION

The invention provides a frame connector adapted to receive an elongated frame member of a kite. The connector has a main body with a surface defining a channel adapted to receive the kite frame member. A retention element extends from the surface defining the channel into the channel for exerting a force on the frame member to retain the frame member in the channel. The retention element is constructed and arranged such that substantially all of the force exerted on the frame member will be via the retention element. In a preferred embodiment, the retention element is a pair of annular protrusions extending inwardly from the surface of the channel, the protrusions being spaced apart from one another along a longitudinal axis defined by the channel.

The retention element of the invention also may define a chamber surrounding the frame member when the frame is positioned in the channel. In this case, the invention also has a passage for introducing an adhesive into the chamber.

The invention also provides a kite frame assembly having at least one frame member and a frame connector. The connector has a main body having a surface defining a channel, and the frame member is positioned in that channel. A retention element extends from the surface defining the channel into the channel and exert a force on the frame member to retain the frame member in the channel. The retention element, frame member and channel are constructed and arranged such that substantially all of the force exerted on the frame member is via the retention element. The retention element, frame member and channel, also may be constructed and arranged to define a chamber surrounding the frame member. A passage may be provided such that a needle may access the chamber, and the chamber may be filled with adhesive.

The invention thus provides an improved frame connector which may be more easily assembled and disassembled onto a frame member, and at the same time providing a more secure interference fit between the frame connector and the frame member. The invention also provides a connector that may be permanently secured to a frame member without difficulty.

These and other features of the invention are described in greater detail below and are shown in the drawings.

DETAILED DESCRIPTION

The invention relates to kite frame connectors and kite frame assemblies. Kite frame connectors include those used at the tip of a kite frame assembly to support the leading ends of wing frame members, those used on the wing frame members for bracing cross frame members and any other such fitting used in connection with kites to interconnect frame members.

The kite frame connectors of the invention are provided with a channel for slidably receiving a kite frame member. The channel may be of any shape such that it will slidingly receive the frame member. Preferably, the channel has the same shape as the frame member, but is slightly larger in cross-section. Common shapes for channels and frame members include round, triangular, square, rectangular, or any other convenient geometry.

The channel may be closed at one end, have a small opening at one end, or be open at both ends such that the connecting member may be positioned at any point along the length of a frame member. The channel further may be completely closed along its length, or may have a longitudinal slit or other opening along a portion of or the entirety of its length.

One aspect of the invention involves providing a structure that allows a better interference fit between the connector member and frame member. Another aspect of the invention involves providing structure allowing the frame member to be secured permanently to the connector. The frame connectors may have either or both of these features.

Figure 1:
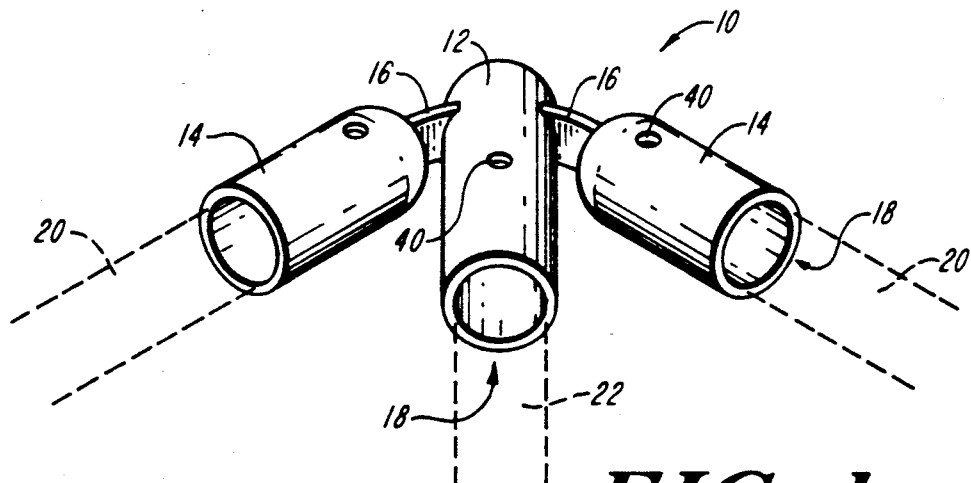
FIG. 1 is a perspective view of a nose fitting according to the invention.

Referring to FIG. 1, a kite frame connector 10 for the nose portion of a frame assembly is shown. The connector 10 has a central body member 12 integrally formed with two side body members 14. The side body members 14 are attached at their leading ends to the leading end of the central body member 12 by living hinges 16, allowing the side body members 14 to be adjusted in their angular relation with respect to the central body member 12. Each of the body members 12, 14 is cylindrically shaped and at least partially hollow, defining cylindrical channels 18. The cylindrical channels 18 of the side body members 14 are closed at their leading ends and open at their opposite ends thereby defining blind channels.

The channel 18 of the central body member 12 is open at both ends, and the opening at the leading end being substantially smaller than the channel diameter and the opening at the opposite end being the same size as the channel.

Side frame members 20 are received in the cylindrical channels 18 of the side body members 14 in an interference fit. A central frame member 22 is received in the cylindrical channel 18 of the central body member 12 in an interference fit.

Passages 40 extend through the side walls 26 of the body members 12 and 14, the function of which will be described in greater detail below.

Figure 2:
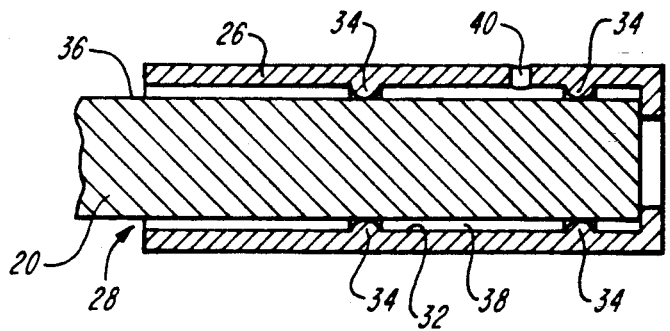
FIG. 2 is a cross-section along lines 2—2 of FIG. 1.
Figure 3:
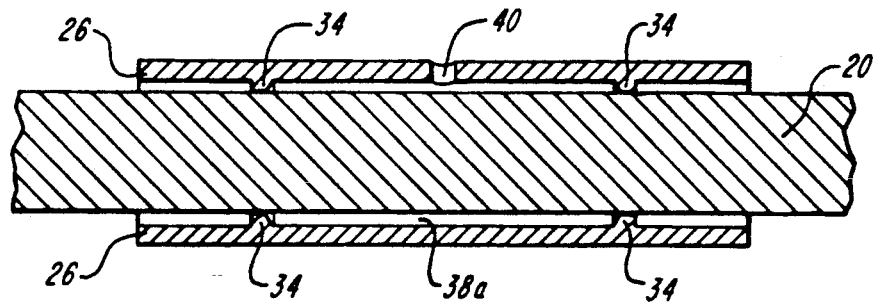
FIG. 3 is a cross-sectional view of another frame connector according to the invention.
Figure 4:
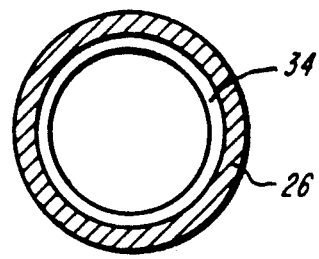
FIG. 4 is a cross-section of the frame connector of claim 1 along line 4—4 and showing a annular retention protrusion.

The interference fit between the central frame member 22 and central body member 12 is shown in cross-section in FIG. 2. The fit between the side frame members 20 and side body members 14, not shown, is essentially the same as that between the central frame and body members. Thus, the following discussion generally applies to the side body members as well as the central body member.

The open end 28 of the central body member 12 receives the cylindrical, central frame member 22. The central frame member 12 abuts against the partially closed end 30 of channel 18 when the central frame member 22 is fully advanced into the channel 18. The interior surface 32 defining the channel 18 of the central body member 12 has, in general, a cross-sectional dimension slightly greater than the cross-sectional dimension of the central frame member 22, thereby defining an annular space between the interior surface 32 and the exterior surface 36 of the central frame member 22.

A pair of annular protrusions 34 extend from the interior surface 32 inwardly into the channel 18 and completely about the interior surface 32 transverse to the longitudinal axis defined by the channel 18. The inner diameter defined by these annular protrusions 34 is less than the outer diameter defined by the central frame member 22, such that the annular protrusions 34 exert a force against the central frame member 22 to hold the central frame member within the channel 18. In the embodiment shown, the annular protrusions 34 are in contact with, and sealingly and forcibly engage, the exterior surface 36 of the central frame member 22.

The frame member 22, body member 12 and annular protrusions 34 together form a chamber 38 defined by the annular space between the central frame member 22 and central body member 12 and closed off at either end by the annular protrusions 34. A passage 40 extends through the side wall 26 of the central body member 12 and communicates with this chamber 38. This passage allows an adhesive to be introduced into the chamber 38 after the central frame member 22 has been positioned within the channel 18 of the central body member 12.

Figure 5:
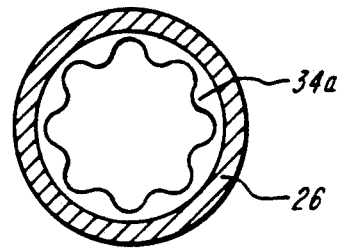
FIG. 5 is a cross-sectional view like that shown in FIG. 4 of another embodiment of a retention protrusion.
Figure 6:
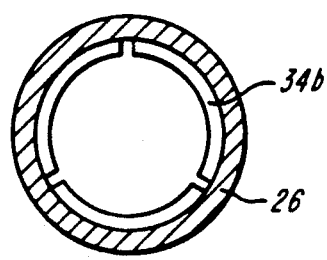
FIG. 6 is a cross-sectional view like FIG. 4 of still another embodiment of a retention protrusion.

The protrusions of the preferred embodiment are annular rings extending completely about the interior surface of the main body. It is not, however, necessary that an annular protrusion extend completely about the interior surface according to all embodiments of the invention. The protrusions may extend, for example, about a substantial portion of a cross-section interior surface defining the channel. There may be a plurality of protrusions 34a configured, for example, as a ring extending transversely about the interior surface of the channel (FIG. 5), or the protrusion 34b may be an annular ring with several breaks or openings (FIG. 6). Other configurations will be apparent to those of ordinary skill in the art.

For an interference fit, an annular ring is preferred as it is believed that a desirable hoop stress is created. Most preferably there are at least two spaced apart annular protrusions.

For defining a chamber for adhesive, it is possible to use only one annular protrusion, particularly in instances when the end of the channel is at least partially closed. For example, an annular chamber 38a is defined by the annular space between the protrusion 34 and the partially closed end 30 of the central body member 12 (FIG. 2). Adhesive for bonding the central frame member 22 to the central body member 12 could be introduced into this chamber 38a instead of at the chamber 38.

The protrusions need not be arranged as transverse rings. The desired interference fit as well as a space for receiving adhesive can be accomplished if the protrusions are arranged in any number of configurations other than a ring structure. It is important that the protrusions define a surface area substantially less than the entire surface area of the interior surface of the channel to reduce the amount of contact between the interior surface of the channel and the frame member thereby allowing the connector to slide more easily along the surface of the frame member while at the same time maintaining the desired interference fit between the frame member and connector.

The protrusions may be omitted altogether when only the advantages of the adhesive chamber are desired. For example, the surface of the channel can be grooved such that a chamber is formed when the frame member is positioned within the channel. Likewise, the frame member, rather than the chamber, could be grooved or ridged to form an adhesive chamber. In selecting the optimal arrangement, it is necessary to determine whether the adhesive used is capable of sticking to both the frame member and the main body, or to only one of the frame member and main body. For example, in the embodiment shown in FIGS. 1-2, it is only necessary that the adhesive be secured to the frame member. In this instance, introduction of an adhesive into the chamber 38 would essentially build up the outside diameter of the frame member, which built up outside diameter would be captured between the annular protrusions 34. The built up region then would abut against the protrusion 34 closer to the open end 28, which would prevent the frame member 22 from being withdrawn from the channel 18.

While various embodiments of the invention are, of course, possible, most preferably the frame member has an external diameter smaller than the diameter of the channel and a pair of annular protrusions both exert substantially all of the force on the frame member and define the chamber for receiving adhesive. This maximizes the ease with which the frame members may be assembled and disassembled onto the connectors, facilitates the use of adhesive to provide a permanent attachment of the connector to the frame member and provides a defined chamber for confining the adhesive preventing both leakage and obviating the need to select only adhesives with certain viscosities.

The passage 40 may extend completely through the side wall 26 of the central body member 12. However, in practice, it is easier to form a molded product wherein the passage 40 extends less than completely through the side wall 26 of the central body member 12, as will be apparent to those of ordinary skill in the art. For example, the passage 40 of the connector may terminate 0.005 inches short of the cylindrical channel 18 to produce a 0.005 inch thick web. This web then may be pierced, for example, by a hypodermic adhesive dispensing needle prior to insertion of the frame member into the connector. Once the frame member is positioned in the connector, adhesive then may be injected (manually, pneumatically or otherwise) into the chamber. Preferably, the passage 40 is larger than the diameter of the needle (or other introducing nozzle) so that air may be purged from the chamber as adhesive is introduced into the chamber, thereby eliminating air bubbles.

In the preferred embodiment, the passage for introducing adhesive extends through the side wall 26 of the central body. However, other passages are contemplated. For example, the adhesive may be introduced into the chamber via the open end 28 of the central body member. A needle may be inserted into the open end, along the annular space between the frame member and central body member and into the chamber via an opening in an annular protrusion or a space between two protrusions.

The connector may be cast or molded from various rubber or plastic material such as synthetic rubbers, nylon and high density polyethylene. In a preferred embodiment, the connector is high pressure injection molded using a thermoplastic rubber and has a shore A density on the order of about 70 to 90 and shore D density on the order of about 35 to 55. Preferably, the material has a sufficient durometer and otherwise is constructed and arranged such that substantially all of the force exerted on a frame member is via the protrusions.

In a most preferred embodiment, when the frame member is a straight cylinder having an OD of one quarter inch, the inner diameter of the cylindrical channel is 0.265 inches, and the inner diameter defined by the annular protrusions is 0.245 inches. The protrusions have a radius of one sixteenth inch and a base of 0.06 centimeters. The pair of annular protrusions are approximately centered in the one inch long channel, with the annular protrusions spaced about 0.4 inches from one another. The channel is beveled at the open ends of the body members, and the side walls of the body members have a thickness of about 0.117 inches.

Those skilled in the art will recognize, or will be able to ascertain using no more than routine experimentation, many equivalents to the specific embodiments of the invention described herein. Such equivalents are intended to be encompassed in the scope of the following claims.

What I claim is:

1. A kite frame connector adapted to receive an elongated frame member of a kite comprising,
    a main body having a surface defining a channel constructed and arranged to receive said kite frame member, and
    retentions means extending from said surface into said channel for exerting a force on said frame to retain said frame in said channel, said retention means comprising a pair of annular protrusions extending inwardly from said surface about a substantial portion of a cross-section of said surface defining said channel, and wherein said pair of protrusions are spaced apart from one another along a longitudinal axis defined by said channel, and wherein said channel along said longitudinal axis and between said protrusions has a substantially uniform diameter.

2. A frame connector as claimed in claim 1 wherein said protrusion extends completely about the cross-section of said surface defining said channel.

3. A frame connector as claimed in claim 1 wherein each of said protrusions extends completely about the cross-section of said surface defining said channel.

4. A frame connector as claimed in claim 1 wherein the retention means has a Shore A density (of) between about (either one of Shore A) 70 to 90 and a Shore D density between about 35 to 55.

5. A frame connector as claimed in claim 1 wherein the channel is open at both ends, whereby the frame member (may be) is passed completely through the main body via the channel.

6. A frame connector as claimed in claim 1 wherein the surface defining the channel has a substantially uniform diameter.

7. A frame connector as claimed in claim 6 wherein the retention means has a Shore A density (of) between about (either one of Shore A) 70 to 90 and a Shore D density between about 35 to 55.

8. A kite frame connector as claimed in claim 1, further comprising a means for introducing an adhesive into said channel.

9. A kite frame connector adapted to receive an elongated frame member of a kite, comprising
    a main body having a surface defining a channel constructed and arranged to receive said kite frame member, retention means extending from said surface into said channel,
    said retention means comprising a pair of annular protrusions extending inwardly from said surface, the retention means being made of a material having a Shore A density between about 70 to 90 and Shore D density between about 35 to 33.

10. A frame connector as claimed in claim 9 wherein said means extending from said surface comprises at least one annular protrusion extending inwardly from said surface about a substantial portion of a cross-section of said surface defining said channel.

11. A frame connector as claimed in claim 9 wherein said means extending from said surface comprises a pair of annular protrusions extending inwardly from said surface about a substantial portion of a cross-section of said surface defining said channel, and wherein said protrusions are spaced apart from one another along a longitudinal axis defined by said channel.

12. A frame connector as claimed in claim 9 wherein said means extending from said surface comprises at least one annular protrusion extending inwardly from said surface completely about a cross-section of said surface defining said channel.

13. A frame connector as claimed in claim 9 wherein said means extending from said surface comprises a pair of annular protrusions extending inwardly from said surface completely about a cross-section of said surface defining said channel, and wherein said protrusions are spaced apart from one another along a longitudinal axis defined by said chamber.

14. A frame connector as claimed in claim 9 wherein said means for introducing adhesive comprises a transverse channel extending at least part way through said body.

15. A frame connector as claimed in claim 14 wherein said means extending from said surface comprises at least one annular protrusion extending inwardly from said surface about a substantial portion of a cross-section of said surface defining said channel.

16. A frame connector as claimed in claim 14 wherein said means extending from said surface comprises a pair of annular protrusions extending inwardly from said surface about a substantial portion of a cross-section of said surface defining said channel, and wherein said protrusions are spaced apart from one another along a longitudinal axis defined by said channel.

17. A frame connector as claimed in claim 14 wherein said means extending from said surface comprises at least one annular protrusion extending inwardly from said surface completely about a cross-section of said surface defining said channel.

18. A frame connector as claimed in claim 14 wherein said means extending from said surface comprises a pair of annular protrusions extending inwardly from said surface completely about a cross-section of said surface defining said channel, and wherein said protrusions are spaced apart from one another along a longitudinal axis defined by said chamber.

19. A kite frame connector as claimed in claim 9, further comprising a means for introducing an adhesive into the channel.

20. A kite frame assembly comprising,
a frame member,
a main body having a surface defining a channel adapted to receive said frame member, and
means associated with said surface, said means, said frame member and said channel constructed and arranged to define a chamber surrounding said frame member when said frame member is positioned in said channel, wherein said means comprises a pair of spaced apart annular protrusions extending inwardly from the surface of the main body, the surface of the main body between the protrusions having a substantially uniform diameter.

21. A kite frame assembly as claimed in claim 20 wherein said chamber is filled at least in part with an adhesive.

22. A kite frame assembly as claimed in claim 20 wherein the means associated with the surface has a Shore A density (of) between about (either one of Shore A) 70 to 90 and a Shore D density between about 35 to 55.

23. A frame assembly as claimed in claim 1 or 20 further comprising a living hinge attached to the main body.

24. A kite frame assembly as claimed in claim 20, further comprising a means for introducing an adhesive into the channel of the main body.

25. A kite frame assembly comprising,
a frame member having a surface,
a main body having a channel adapted to receive the frame member, and
means associated with said frame member, said means, said frame member and said channel constructed and arranged to define a chamber in said surface when said frame member is positioned in said channel, wherein said means comprises a pair of annular protrusions having made of a material having a density of between either one of Shore A 70 to 90 and Shore D 35 to 55.

26. A kite frame assembly as claimed in claim 25, further comprising a means for introducing an adhesive into the channel of the main body.

* * * * *